M. F. FIELD, C. D. LANNING, E. F. HATHAWAY AND F. C. BLANCHARD.
MACHINE FOR OPERATING UPON WARP THREADS.
APPLICATION FILED FEB. 6, 1903.

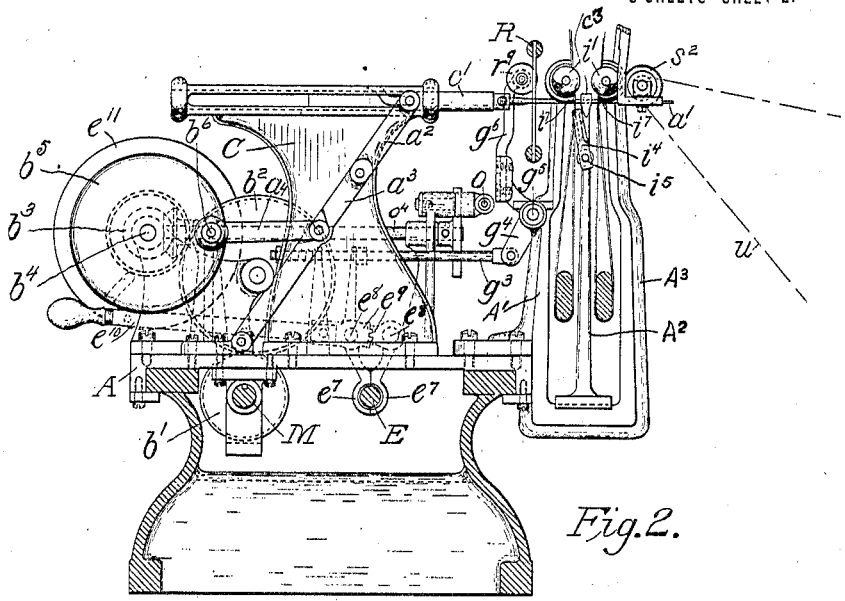
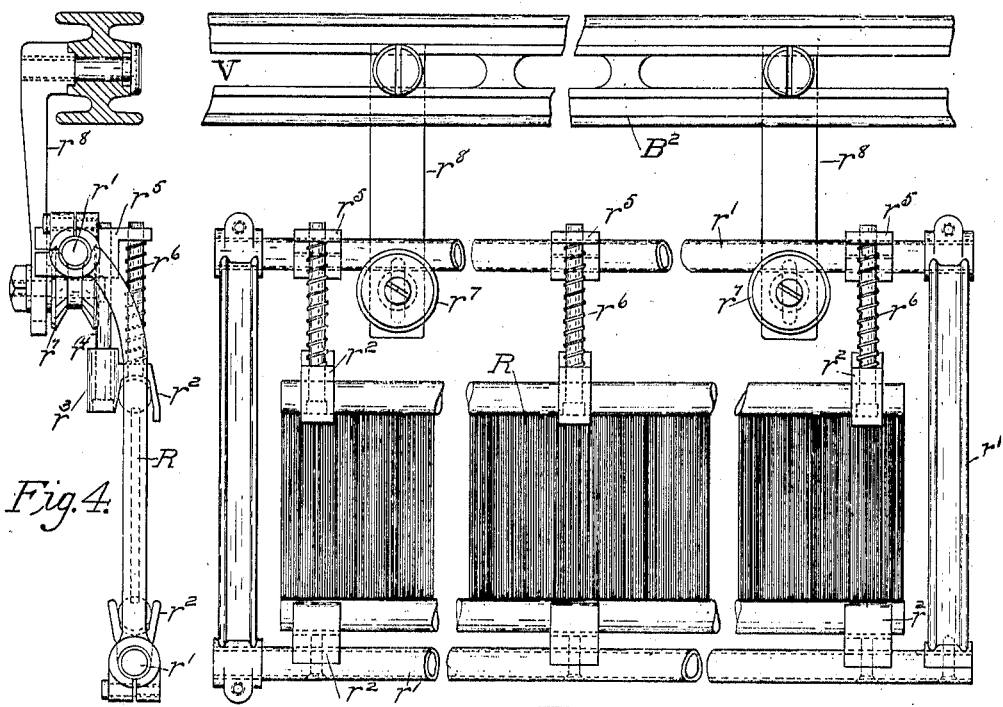

1,383,195.

Patented June 28, 1921.

WITNESSES:
Agnes B. Hudson
Walter L. Frost

INVENTORS.
Millard F. Field
Charles D. Lanning
Edgar F. Hathaway
Frederick C. Blanchard.

By Geo. H. Roberts & Bro.
ATTORNEYS.

M. F. FIELD, C. D. LANNING, E. F. HATHAWAY AND F. C. BLANCHARD.
MACHINE FOR OPERATING UPON WARP THREADS.
APPLICATION FILED FEB. 6, 1903.

1,383,195.

Patented June 28, 1921.
8 SHEETS—SHEET 4.

M. F. FIELD, C. D. LANNING, E. F. HATHAWAY AND F. C. BLANCHARD.
MACHINE FOR OPERATING UPON WARP THREADS.
APPLICATION FILED FEB. 6, 1903.
1,383,195. Patented June 28, 1921.
8 SHEETS—SHEET 5.
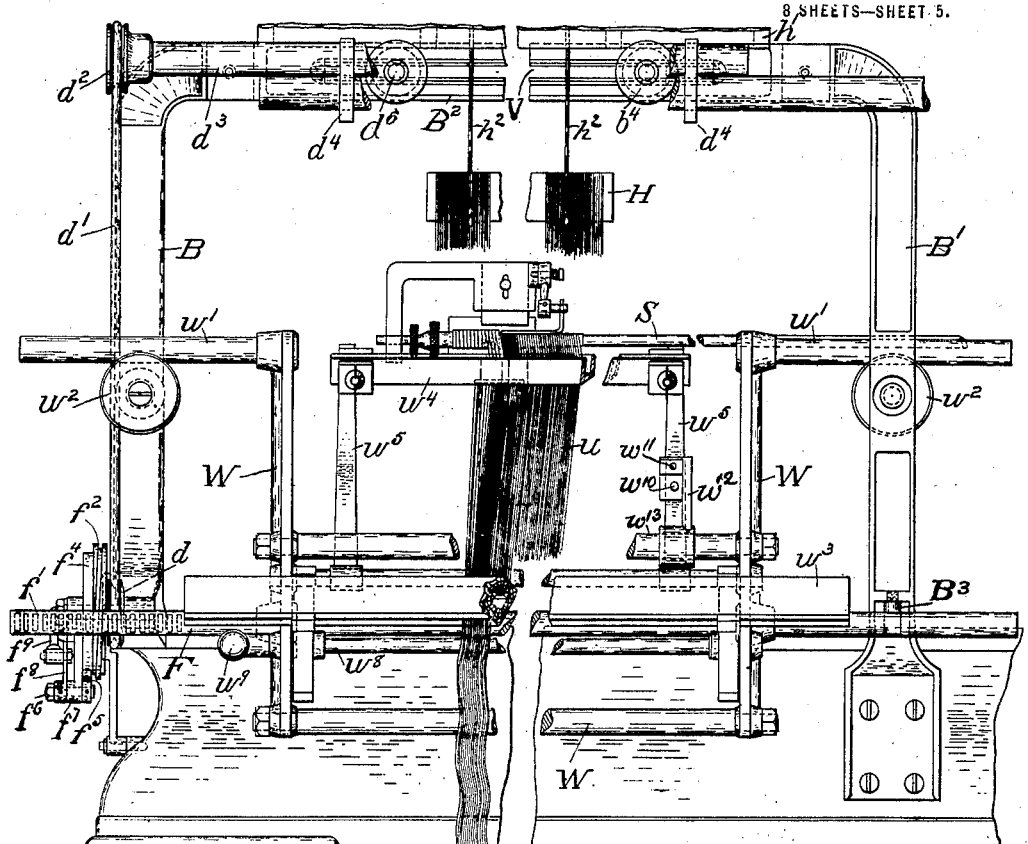
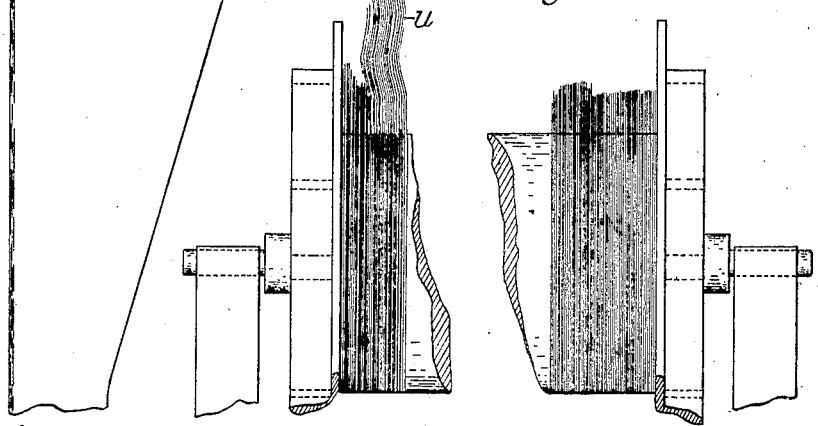
Fig. 7.
WITNESSES:
INVENTORS.

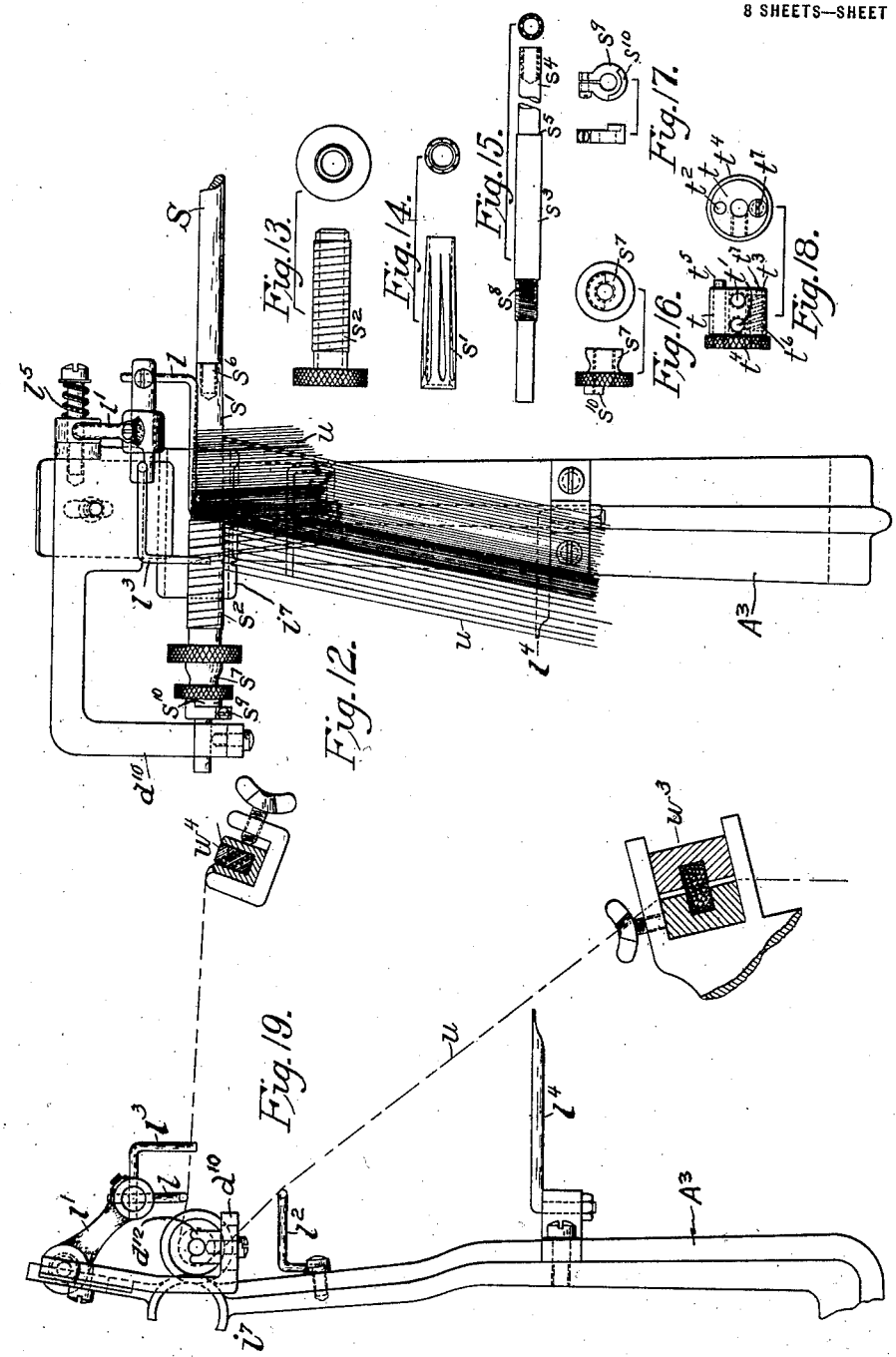

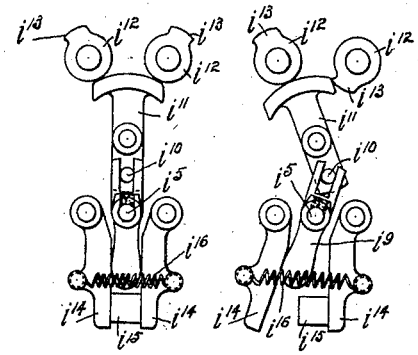
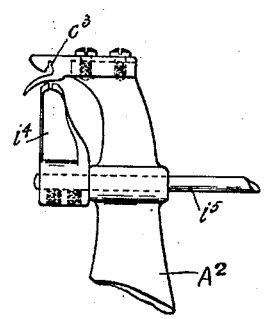
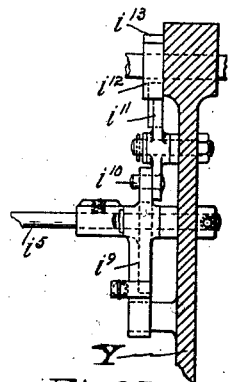
Fig.21.    Fig.22.    Fig.24.    Fig.23.
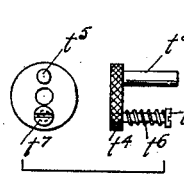
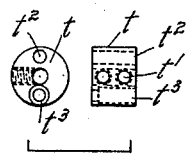
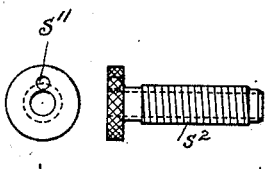
Fig.25.    Fig.26.    Fig.27.
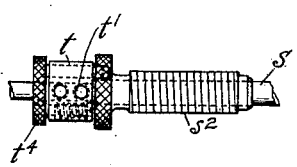
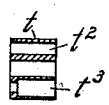
Fig.28.    Fig.29.

UNITED STATES PATENT OFFICE.

MILLARD F. FIELD, OF WINTHROP, AND CHARLES D. LANNING AND EDGAR F. HATHAWAY, OF BOSTON, MASSACHUSETTS, AND FREDERICK C. BLANCHARD, OF FORT WAYNE, INDIANA, ASSIGNORS, BY MESNE ASSIGNMENTS, TO BARBER-COLMAN COMPANY, OF ROCKFORD, ILLINOIS, A CORPORATION OF ILLINOIS.

MACHINE FOR OPERATING UPON WARP-THREADS.

1,383,195.  Specification of Letters Patent.  Patented June 28, 1921.

Application filed February 6, 1903. Serial No. 142,251.

*To all whom it may concern:*

Be it known that we, MILLARD F. FIELD, of Winthrop, CHARLES D. LANNING and EDGAR F. HATHAWAY, both of Boston, all in the county of Suffolk and State of Massachusetts, and FREDERICK C. BLANCHARD, formerly of said Boston, but now of Fort Wayne, in the county of Allen and State of Indiana, have invented certain Improvements in Machines for Operating upon Warp-Threads, of which the following is a specification.

This invention relates to improvements in warp-drawing machines, particularly to mechanism by which the loom harnesses and the warp-holding devices are held and adjusted in the drawing-in-machine, in relation to one another and in relation to the drawing-in needle, also to the construction of the warp-separating and feeding devices, and the means for independently adjusting them, and the combination of the above-named invention with means for automatically adjusting the loom reed; and the invention consists in the novel mechanism and devices by which the harnesses and warp-holding frame are fed or automatically moved longitudinally in one direction or the other to compensate for the differences in width between these several parts, and the differences between the normal spacing of the reed splits, harness eyes and warp-threads, and also the differences between the amount or space normally occupied by a given number of reed-dents, harness-eyes, and warp-threads, and the space or distance through which the needle carriage moves during the time that the drawing-in needle is operating upon that given number of dents, eyes and warps.

The invention further consists in a novel construction of the warp-thread feed-screw, by which it may be adjusted by the operator when necessary with a minimum loss of time in stopping the machine, to correct any inaccuracies which may occur in the selection of the threads by the automatic operation of the feed-screw; and further, in some minor parts of the machine and in the new combination and coöperation of all the above-named parts; all of which will be hereinafter more particularly described and specified in the claims.

This present invention covers improved means for accomplishing the automatic feeding of thread holding means for holding a body or series of warp threads and the contained threads with reference to an independently fed, thread separating device, by mechanism positively connecting the warp holding means and the main driving mechanism of the machine, with which latter the driving mechanism of the thread separating device is also connected.

By reason of the fact that in nearly all cases there is a difference in width between the reed and harnesses and between each of them and the entire width of the series of warp threads, as also irregularity in the number or dents per inch in the reed and eyes per inch in the harnesses, and in the spacing of the warps as they are led from the beam, while the traversing movement or feed of the carriage which supports the drawing-in needle and warp-feed screw, is uniform and always the same per unit of time, it has become absolutely necessary for the purpose of accomplishing successful practical results in the operation of drawing in warps by machines of this character, to have a compensating feed or movement of all but one, at least, of the different parts or devices mentioned which are involved in the operation of warp-drawing, either as devices which act or are acted upon. Either the drawing-in device, the reed, a harness or the warp-holding devices, may be held in an unvarying position, and the others fed in relation thereto; but for the best practical results it is found to be preferable to employ a regular feed for the needle carriage without incidental compensating action, and to apply the compensating or differential movements to the reed, the harnesses and the warp-thread holders, so as continually to adjust and successively aline one of the component or contained parts of each of the series of elements acted upon, with the path of the drawing-in needle at each of its reciprocations. The specific embodiment of these improvements illustrated in the accompanying drawings will be readily understood from the description following. In these drawings the feed for the needle carriage is continuous; but it may be intermittent.

In the use of the machine the operator usually stands on the side where the warp-clamps and warp-feeding screw are supported, which may be designated the front of the machine.

In the drawings:

Fig. 2 is an elevation of the same end of the machine with the end frame and the parts exterior thereto removed, as is also the warp-thread holding frame and its attachments, and the parts which support the reed and harnesses.

Fig. 3 is a front elevation of the reed and its supporting parts.

Fig. 4 is an end elevation of the reed and supporting parts with the upper support or rail in section.

Fig. 7 is a front elevation, showing the upper part of a harness with its improved supports and the automatic and hand adjusting mechanism for the warp-holding devices; the warp-clamps, and adjustable supporting frame, and the shaft for the warp-feed screw, are broken away near their middle portions.

Figure 8:
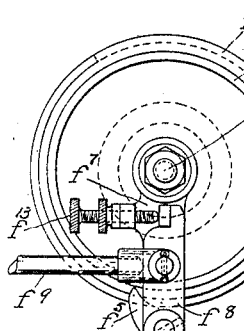

Fig. 8, Sheet 3, is an enlarged side view of the warp-frame feed worm, showing more clearly the construction and operation of the pawl-clutch mechanism by which the worm is driven.

Figure 9:
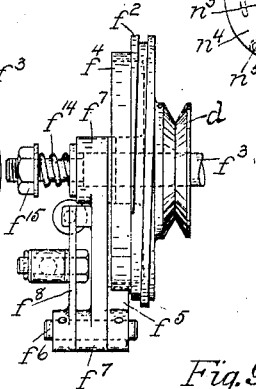

Fig. 9, Sheet 3, is an edge view of the same parts, also of the grooved wheel by which the worm can be turned through intermediate connection with the hand adjusting mechanism.

Figure 10:
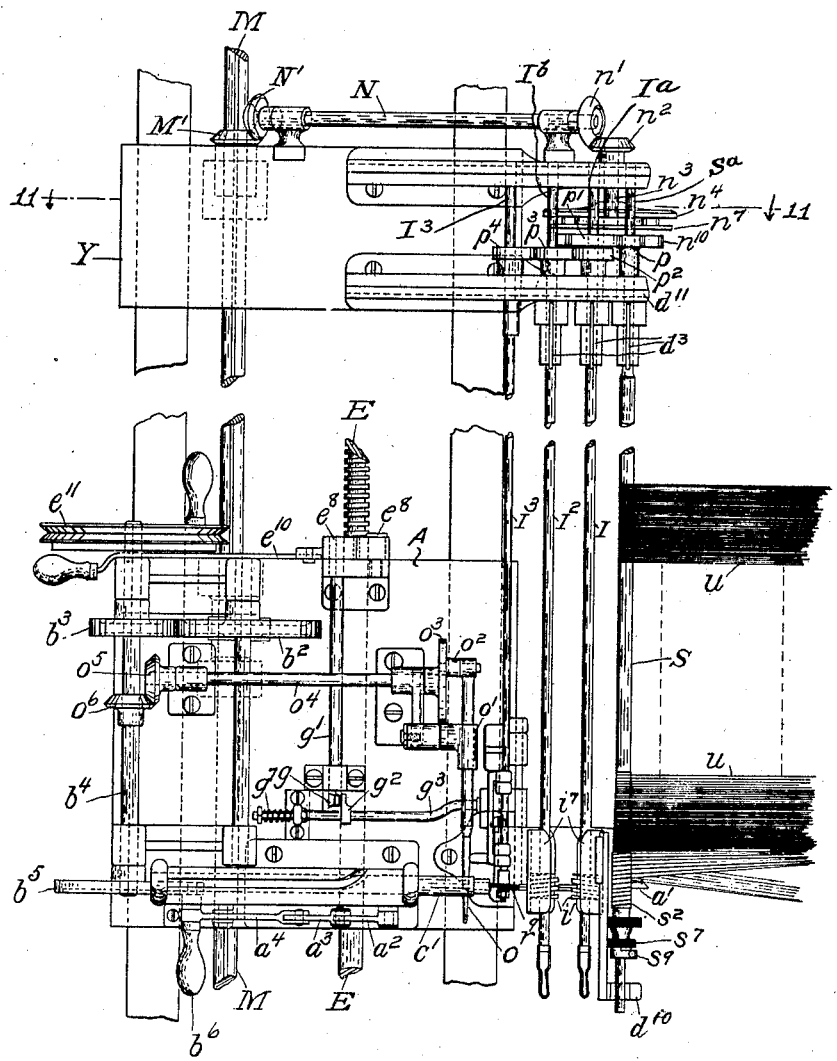

Fig. 10 is a plan of a portion of the lower part of the machine showing the driving mechanism, the drawing-in needle and its carriage, the harness eye feeding screws, the warp-feed screw, the reed opener and thread stripping device and their operating mechanism. All the portions above said screws and the end frames and the parts which they support are removed.

Figure 11:
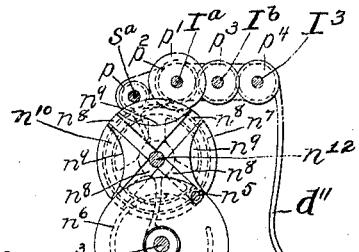

Fig. 11, Sheet 3, is an elevation of the gears by which the shafts of the warp-feed, harness-feed, and reed-feed are operated, the view being taken in the plane of dotted line 11—11 of Fig. 10.

Fig. 12 is a detail elevation of the improved warp-feed-screw and supporting frame.

Fig. 13 is a side and end elevation of the sleeve with the warp-separating screw thread.

Fig. 14 is a side and end elevation of the grooved frusto-conical part of the warp-shaft.

Fig. 15 is a side and end elevation of the portion of the feed-screw shaft, upon which the feed-screw and frusto-conical sleeve are supported.

Fig. 16 is a side and end elevation of a nut for clamping or locking the warp-feed-screw sleeve to the shaft.

Fig. 17 is a side and end elevation of a check-clamp to limit the rotary movement on the shaft of the clamp-nut of the warp-feed screw sleeve.

Fig. 18 is a side and end elevation of another form of locking device for the warp-feed screw.

Fig. 19 is a detail showing a portion of the frame which supports one end of the warp-feed screw, warp-clamps and devices which assist in separating the warp-threads, also devices which assist to determine their angle of slope in reference to the engaging end of the feed-screw, and to the path of the drawing-in needle, and others which assist to regulate the tension of the threads.

Figure 20:
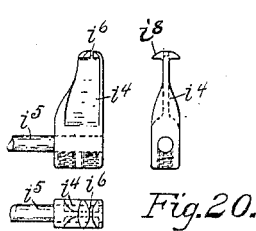

Fig. 20, Sheet 3, shows three views, two in elevation and one a plan, of a device which is herein designated a flipper, employed to assist in holding the harness-eyes in proper position during the drawing-in operation.

Fig. 21 is an elevation showing the cams and interconnecting parts by which the flipper shaft is rocked, all occcupying the position which they assume when the flipper is in the middle or inoperative position.

Fig. 22 is an elevation of the same parts with one of the cams operating upon the interconnecting levers to tilt the flipper to the right.

Fig. 23 is a side elevation of the parts shown in Fig. 21.

Fig. 24 is an enlarged side elevation of the flipper, one of the bearings for its shaft, and a needle-guide over the flipper.

Fig. 25 are end and side elevations of the knurled disk with the pin and screw projecting therefrom removed from the ring, which are assembled in Fig. 18.

Fig. 26 are end and side elevations of the ring which receives the parts shown in Fig. 25.

Fig. 27 are end and side elevations of the warp feed-screw. The end being that viewed from the left of the side elevation, and shows the hole into which the end of the pin shown in Fig. 25, projects, to lock the feed-screw.

Fig. 28 shows the parts illustrated in Figs. 25, 26 and 27, asssembled upon the feed-screw shaft.

Fig. 29 is a longitudinal sectional view of the part shown in Fig. 26, taken through the axes of the three holes therein.

In order that the operation of the novel features may be clearly understood, the entire machine will be described in connection with such features.

Referring to the drawings: A is the traversing carriage upon which is supported the reciprocating drawing-in needle $a'$ on a standard C, the mechanism which operates the needle, the device to strip the drawn in threads from the needle, the thread-selecting mechanism and the reed-dent opener. M is the main driving shaft and through the train of gears $b'$ $b^2$ $b^3$ and shaft $b^4$, the crank wheel $b^5$, on one end thereof, is driven. Upon the standard C the needle is reciprocated by means of a toggle lever $a^2$, $a^3$; the free end of the short arm $a^2$ is pivoted to the needle-holder $c'$, and the free end of the long arm $a^3$ is pivoted to the carriage A. This toggle lever is operated by means of a link $a^4$, one end of which is pivoted to the arm $a^3$ and the other end to the crank-wheel $b^5$. A handle $b^6$ is attached to the crank-wheel so that the needle $a'$ may be operated by hand when occasion requires. E is the feed-screw for traversing the carriage A, and in this construction it is rotated continuously so as to give the carriage a constant movement along the machine frame. The screw E is rotated by means of a gear $e'$ which meshes with a small idler gear $e^2$ on a shaft $e^3$, which shaft is hung in bearings that may swing upon the driving shaft M. Another gear $e^4$ on the shaft $e^3$ meshes with a pinion $e^5$ on the shaft M. The gear $e^2$ on the shaft $e^3$ may be adjusted in relation to the gear $e'$ by means of a segmental slot $e^6$ in an arm attached to a sleeve on the shaft $e^3$, and this furnishes means for readily substituting gears of different sizes for the gear $e^2$ when it is desired to change the speed of the feed-screw E. A clamping nut on a screw which projects from the frame through the slot $e^6$ serves to hold the gear $e^2$ in the desired position. The nut which engages the feed-screw E, and by which the carriage A is caused to move across the machine, is made in two parts, $e^7$, $e^7$, at the end of short arms, each pivoted at $e^8$, $e^8$ in bearings on the frame (see Figs. 2 and 5). These arms have small hub portions around their pivots, and upon the inner sides of these hubs adjacent to each other are toothed segments $e^9$, $e^9$ which engage one another and operate to open and close the two parts $e^7$, $e^7$ of the nut, when a hand lever $e^{10}$ which is secured to one of the hubs is raised and lowered. By this means the carriage A is stopped and put in motion.

R is the reed which is supported in a frame or carriage $r'$, Fig. 3, between U-shaped clasps $r^2$, the upper series of which clasps are attached to sleeves $r^3$ which may slide up and down upon rods $r^4$ secured in brackets $r^5$ which are clamped to the upper bar of the frame $r'$ (see Figs. 3 and 4). The upper clasps $r^2$ are pressed upon the reed when it is in place by springs $r^6$ coiled about rods which extend from the clasps upward through holes in projecting parts of the brackets $r^5$. The upper bar of the reed frame rests upon grooved rollers $r^7$ vertically adjustable upon hangers $r^8$, which are secured to the upper cross-bar $B^2$ of the frame of the machine. By this arrangement the reed with its supporting frame is free to be readily adjusted longitudinally by the pressure of the reed-dent opener $r^9$ upon the splits.

Figure 5:
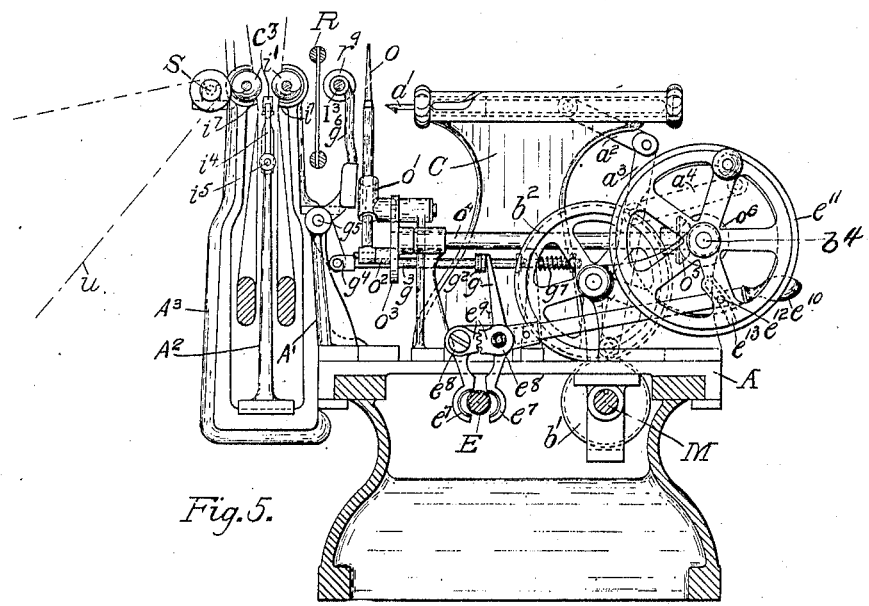
Fig. 5 is a right hand elevation of the same parts of the machine as are shown in Fig. 2, with the reed-dent opener withdrawn from the reed, the needle drawn back, the carriage traversing nut released, and all the mechanism on the carriage locked.

In Fig. 2 the reed adjuster and dent opener $r^9$ is shown in engagement with the reed R. This reed opener is upon a shaft $I^3$, Fig. 10, which is rotated by means of the intermittent driving mechanism at the opposite end of the machine, each time that a new dent of the reed is to be presented for the passage of the drawing-in needle. In Fig. 5 the dent opener $r^9$ shown withdrawn from the reed. The operation of withdrawing the opener $r^9$ takes place when the hand-lever $e^{10}$ is raised, and is accomplished by means of a lever $g$ secured upon a short shaft $g'$, the hand-lever $e^{10}$ also being fixed upon said shaft. (See Fig. 10.) The upper end of the lever $g$ bears against a projecting lug $g^2$ upon a sliding rod $g^3$ which is supported in suitable bearings upon the carriage A; one end of the rod $g^3$ is pivotally connected to the lower arm of a bell-crank $g^4$, fulcrumed at $g^5$ on a standard A' rising from the carriage A; and to the upper arm $g^6$ of this bell-crank $g^4$ the bearing for the reed opener shaft $I^3$ is secured. When the lever $e^{10}$ is lowered, a spring $g^7$ around the opposite end of the rod $g^3$ draws that rod back and throws the reed opener $r^9$ forward into the reed dents again. The hand-lever $e^{10}$ lies closely beside the hand wheel $e^{11}$, which is fastened upon one end of the counter driving shaft $b^4$, and by reason of a projecting pin $e^{12}$ upon the side of the hand-lever next the wheel $e^{11}$, the hand-lever can be raised only when a slot $e^{13}$ in the side of the wheel $e^{11}$ is in the proper position to permit the pin $e^{12}$ to enter the slot $e^{13}$ and move upward therein. When the wheel $e^{11}$ is in such position, the drawing-in needle $a'$ is at the extreme limit of its backward stroke, and when the hand-lever is raised the needle operating mechanism is locked, the two part nut $e^7$, $e^7$, is opened and disengaged from the feed-screw E, the reed-opener $r^9$ is withdrawn from the reed, and the machine is in condition to allow the carriage A to slide back to its normal position, or to be otherwise adjusted, the reed to be removed or adjusted, the harness-eye adjusting screws and warp-feed-screw to be removed, and the warp-filled harnesses to be withdrawn and others inserted. It is, of course, understood that the drive shaft M is disconnected in any suitable way from its drive pulley or other source of power (not shown) before the hand lever $e^{10}$ is lifted into engagement with the wheel $e^{11}$.

Means is provided whereby the operator, if desired, may manually actuate the machine while standing in front thereof. Said means comprises a grooved pulley $e^{14}$ (Fig. 1) supported upon a structure $A_4$ rising from the carriage A. The pulley $e^{14}$ is connected by a belt $e^{15}$ to the pulley or wheel $e^{11}$. On the pulley $e^{14}$ is a handle $e^{16}$. After disconnecting the shaft M from its source of power, the operator may rotate the hand wheel $e^{14}$, thereby driving all the mechanisms of the machine.

Figure 6:
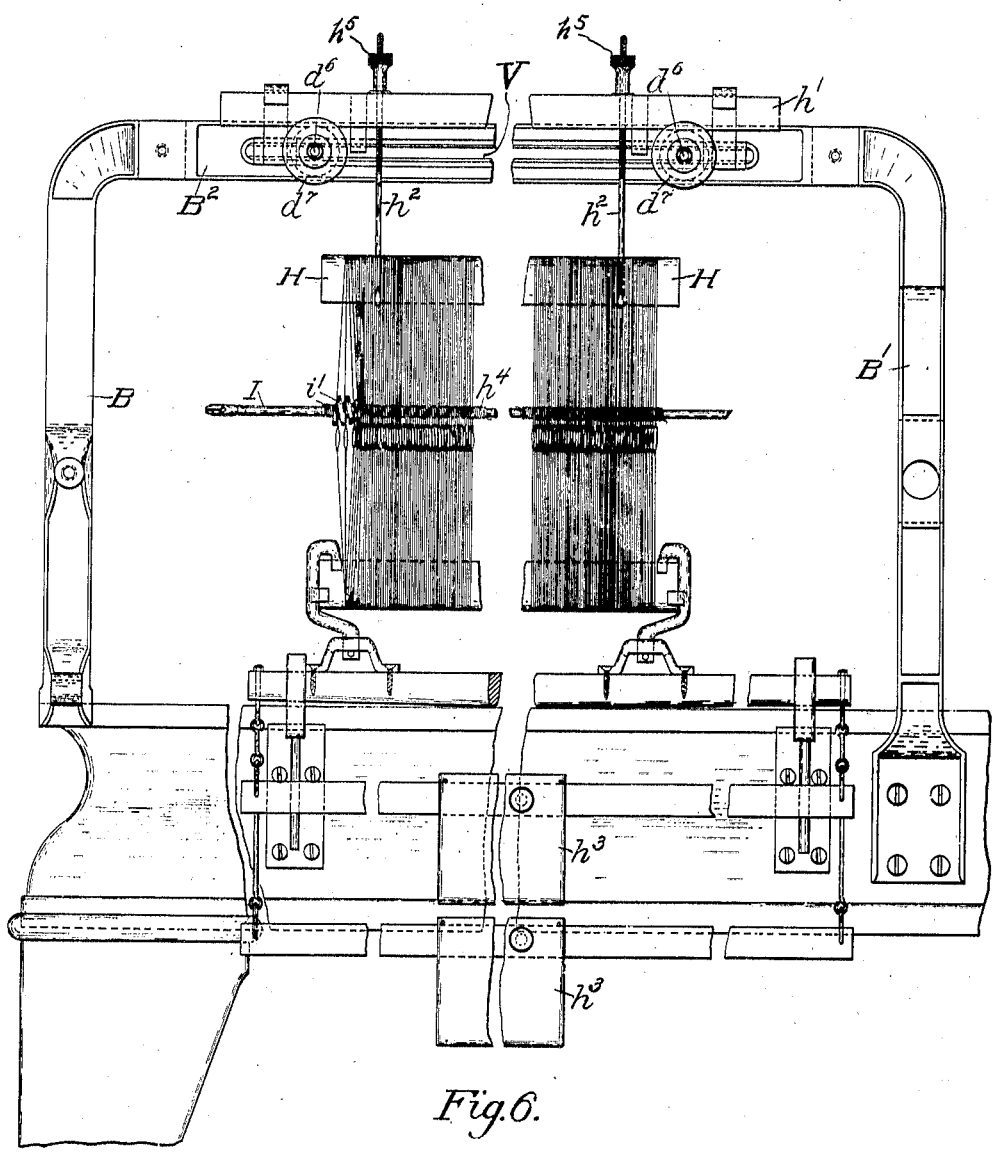
Fig. 6 is a front elevation of a harness with the harness feed-worm and its shaft in place and the improved supports and other attachments broken away at the middle. Although only one harness is visible in Fig. 6, the tensioning devices for both harnesses are shown.

The improved construction by which the harnesses are made capable of a longitudinal movement at right angles to the path of reciprocation of the drawing-in needle, for the purpose of compensating for the irregularity in the spacing of the harness eyes, and the difference in width between the harnesses and the reed, is more particularly illustrated in Figs. 6 and 7, wherein B, B' are the uprights and $B^2$ the cross-bar of the machine frame upon which the harnesses are supported. The parts B, B' and $B^2$ constitute an arched structure rising from the bed of the machine. The cross-bar $B^2$ is slotted at V, and in the slots two studs $d^6$ are adjustably secured; upon these studs are anti-friction rollers $d^7$, $d^7$, one pair for each harness. Each harness H is hung from a bar $h'$ by means of rods $h^2$. The rods or suspending devices $h^2$ may be made adjustable in any suitable way, as by placing upon their upper screw-threaded ends nuts $h^5$ that rest upon the bars $h'$, whereby the harnesses may be adjusted so that the point of the needle $a'$ shall enter at about the center of each heddle eye. The bar $h'$ rests upon a pair of the rollers $d^7$, thus permitting the harness to be easily moved longitudinally parallel with the reed and at right angles to the path of reciprocation of the needle $a'$.

As a means for steadying the harnesses and holding the harness cords under sufficient tension to facilitate the accurate separation and manipulation of the harness-eyes for the purpose of drawing in warps, weights $h^3$ may be suspended from the lower bar of each harness, as shown in Fig. 6, or springs may be used instead of weights for this purpose.

A helical coil of wire $h^4$ is inserted into each harness, above the eyes, with one of the supporting cords of each eye lying in the successive convolutions of the helical coil throughout the series; through these coils are passed shafts I, $I^2$, each of which is provided with a short worm or coarse screw-section $i'$, which will engage the convolutions of the wire coil when the worm is rotated. The bottom of the thread of this worm is made of the proper width to admit one cord only, and when the worm progresses through the coil and engages the support of each harness-eye, the opening in the eye will be presented in proper position for the passage of the drawing-in needle, and when the harness-eye supports are under the proper tension each harness will immediately adjust itself upon the rollers $d^7$ to compensate for the difference in width between that harness and the reed, and for any irregularity in the spacing of the supporting cords. It will be seen that the rotary worm acts to feed or adjust the harness support endwise through its constant and continuous engagement with a plurality of successive heddles, thereby exercising a steady but forcible pull on the harness, which pull is well distributed over a plurality of successive heddle strands.

As an additional device for assisting in holding the harness eyes accurately and securely in position for the passage of the drawing-in needle, a tilting arm or finger $i^4$ (Fig. 20), which may be designated a "flipper," is supported upon a rod $i^5$, between the harnesses, in a position which will place the top of the flipper just below the bottom of the harness-eye. The upper end of the flipper is provided with a projecting lip $i^8$ upon either side, and the whole is slotted across at $i^6$ in the vertical plane of the drawing-in needle (see Fig. 20).

The flipper is tilted against the heddles of one harness and then against those of another by mechanism as follows:—On that end of the rod $i^5$, which is supported on the gear head Y is secured an arm $i^9$ which projects above and below the shaft. The upper end of the arm $i^9$ is slotted and receives a pin $i^{10}$, projecting from the lower end of a tilting lever $i^{11}$, the upper end of which lever is provided with a curved surface concentric with the pintle on which the lever tilts. Against this curved surface bear two disks $i^{12}$ which are rotated in opposite directions by means driven in any suitable way from the shaft M, and each is provided with a cam projection $i^{13}$, which cams are arranged to engage the ends of the curved bearing surface, alternately and thus tilt the lever $i^{11}$ one way and then the other, and through the engagement of the pin $i^{10}$ with the slot in the upper end of the arm $i^9$, tilt the shaft $i^5$ and the flipper $i^4$. The lower end of the arm $i^9$ is located between two swinging fingers $i^{14}$, which fingers are held normally against a stop $i^{15}$ by a spring $i^{16}$ attached to each. The action of the cam projections $i^{13}$ upon the lever $i^{11}$ is, through the arm $i^9$, against the pull of the spring $i^{16}$, and as soon as the cams $i^{13}$ cease to act, the spring $i^{16}$, through the fingers $i^{14}$, force the arm $i^9$ into an upright or central position again, and with it the flipper $i^4$. At each movement of the flipper its slotted upper end embraces one heddle of a harness, just below the eye and holds it securely during the passage of the needle, and as an additional means for preventing vibration of the needle a guide $c^3$ is secured above the flipper upon the standard $A^2$ which supports the shaft $i^5$.

Besides the flipper $i^4$ which engages the heddle below the eye, a ledge $i^7$ is provided on each of the standards $A^1$ and $A^3$ on the carriage A, which ledge projects far enough across the separating screw $i'$ to serve as a bearing for each heddle above the eye when the flipper presses upon it below the eye, thereby maintaining each harness-eye in a fixed position during the passage of the drawing-in needle. As will be understood from Fig. 2, the flipper $i^4$ when swung against the heddle causes the eye to lie flat against the ledge $i^7$ so as to be properly faced and held for the passage of the needle $a'$. Although in the present embodiment the ledge $i^7$ extends around into engagement with the heddle at a point above as well as below the screw $i'$, it will be understood that the illustrated arrangement may be modified in various ways. It may be here noted that the heddle-separating screw $i'$ rests upon the ledge $i^7$.

O is the device which strips each warp-thread from the needle after it has been drawn into the harness-eye and reed-dent. This stripper O is supported in a pivoted sleeve $o'$, through which it is caused to slide back and forth by the pivotal connection of its rear end to a crank-pin $o^2$ on the wheel $o^3$. The wheel $o^3$ on a shaft $o^4$ is rotated from the shaft $b^4$ by bevel gears $o^5$, $o^6$ (see Figs. 5 and 10). By this arrangement the point of the stripper is given quick downward movement across the thread in the hook of the needle, it is then drawn back and in its slower rising movement does not cross the path of the needle, thus moving in a substantially elliptical path about the line of reciprocation of the needle.

The mechanism by which the series of warp-threads is given a differential adjustment in relation to the movement produced upon them by the thread-selecting, separating and feeding devices, and in relation to the traversing movement of the carriage which supports the drawing-in mechanism, consists of a warp-clamp frame W supported by bars $w'$ which rest upon anti-friction rollers $w^2$, one of which rollers is journaled in an arm projecting from the upright B, the other roller being supported in a recess in the bowed portion of the upright $B'$. These uprights are shown in side elevation in Fig. 1, and in front elevation in Fig. 6. The rollers $w^2$ permit the frame W to be easily moved longitudinally, that is, parallel with the traversing movement of the carriage which supports the warp-feed screw and the drawing-in needle.

Figure 1:
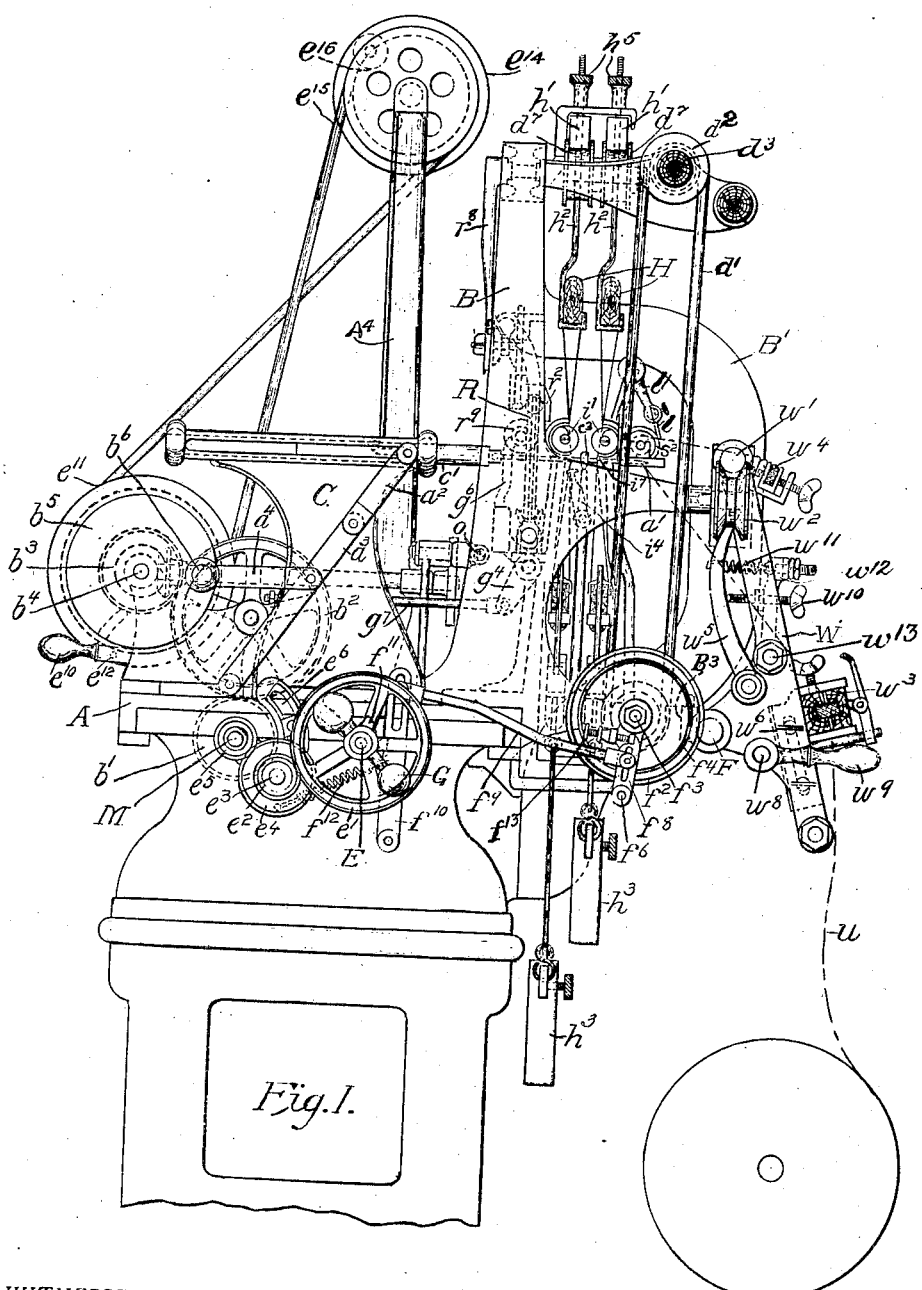
Figure 1 is a left hand elevation of the warp-drawing machine, certain parts behind the frame being shown in dotted lines.

Referring to Figs. 7, 8, 9; this differential movement or change in position of the warp-clamp frame is accomplished by means of a rack $f'$ upon the bar F, which bar is secured in the frame W. The rack $f'$ is engaged by a worm $f^2$ of low pitch, journaled in the frame of the machine at $f^3$. The opposite end portion of the bar F rests against a roller $B^3$ (Figs. 1 and 7) on the upright $B'$. Upon the outer face of the worm $f^2$ is an annular flange $f^4$ which is engaged by a clutch consisting of a sharp toothed pawl $f^5$ which bites upon the outer surface of the annular flange $f^4$ when it is swung to the right, as shown in Figs. 1 and 8, and slides over the flange when swung in the opposite direction. This pawl is secured upon one end of a pivot $f^6$ that is supported in a bracket $f^7$ hung upon the journal $f^3$. Upon the outer end of the pivot $f^6$ a lever $f^8$ is fastened, and this lever is connected by a rod $f^9$ to the upper end of another lever $f^{10}$, the lower end of which latter, is pivoted to the frame of the machine, and in such position that a cam projection $f^{11}$ near the end of the feed-screw E will strike the lever $f^{10}$ at each revolution of the feed-screw, and thus force it to the right, and through the connecting rod $f^9$ will move the lever $f^8$, together with the pawl $f^5$, in the same direction; the lever $f^8$ and pawl $f^5$ are both secured to the pivot $f^6$. As soon as the cam $f^{11}$ ceases to act upon the lever $f^{10}$ a spring $f^{12}$ attached thereto will draw it back to its normal position, as represented in said Fig. 1. The levers $f^8$ and $f^{10}$ may be slotted so that the connection of the rod $f^9$ with each may be adjusted in relation to their respective fulcrums for the purpose of regulating the stroke of the lever $f^{10}$, and thus vary the arc through which the bracket $f^7$ will be swung and the worm $f^2$ will be turned by the pawl $f^5$, and consequently the distance that the warp-clamp frame W will be moved, through the action of the worm upon the rack $f'$, see Figs. 1 and 8. The limit of the backward swing of the lever $f^8$ may be regulated by the adjusting screw $f^{13}$ supported upon the bracket or lever $f^7$. In order that the lever $f^7$ shall not swing upon its axis $f^3$ quite so freely as the lever $f^8$ swings upon the axis of the pivot $f^6$, a coiled expansion spring $f^{14}$ is placed on the end of the spindle $f^3$ between a nut $f^{15}$ and the bracket $f^7$. (Fig. 9). The screw $f^{13}$ is adjusted so that there is a slight amount of movement between the levers $f^7$ and $f^8$, the pawl $f^5$ pressing against the periphery of the flange $f^4$ when the rod $f^9$ is pushed by the cam $f^{11}$ and swinging clear of the flange $f^4$ when the rod $f^9$ is pulled back for the spring $f^{12}$. A handle G it attached to the end of the feed-screw E for the purpose of hand adjustment of the carriage A. The interconnecting mechanism between the feed-screw E and the worm $f^2$ should be so adjusted that during a given unit of time the distance which the warp-frame is moved shall bear the same ratio to the excess of width of the warp over the width of the widest harness, that the distance which the needle carriage is moved in the same unit of time, bears to the width of such harness.

In addition to this mechanism for the automatic adjustment of the warp-clamp frame W, a hand adjustment is provided consisting of a grooved pulley $d$ (Figs. 7 and 9) upon the hub of the worm $f^2$, which pulley is connected by a belt $d'$ with another grooved pulley $d^2$ fixed upon a shaft or rod $d^3$, which is supported in brackets $d^4$ at the top of the frame of the machine. By turning the shaft $d^3$ the operator can through the pulley $d^2$, belt $d'$ and pulley $d$ turn the worm $f^2$ and adjust the position of the warp-clamp frame W at any time, independently of the mechanism for automatic adjustment, and without in any way interfering with its proper action in the regular operation of the machine; for the worm $f^2$ is free to be turned by hand at all times, excepting during the short intervals when the pawl $f^5$ is in engagement therewith. By this hand operated mechanism, also, the warp-frame may be adjusted for the purpose of regulating the slope or angle of the warp threads in relation to the pitch of the thread of the warp spacing and feeding screw, which is a matter of importance for accuracy of operation in a warp-drawing machine of this character. Since the shaft or rod $d^3$ extends (as shown in Fig. 7) the entire width of the warp frame, and substantially the entire length of the machine, the work of the attendant is thereby greatly facilitated, for he is enabled manually to adjust the warp at any position which he may take lengthwise the machine. This is of advantage, for the attendant can follow the action of the separating mechanism at the front of the machine during the drawing-in action, while having constantly at hand the means manually to correct any errors in the adjustment of the warp.

The warp-threads $u$ are put under proper tension for the operations of the separating and feeding mechanism by adjusting the lower clamp $w^3$ up or down in the main frame W, by means of racks $w^6$ on the clamp frame, and pinions, not shown, on the shaft $w^8$, which shaft is operated by a lever $w^9$ and further adjustment of the tension is accomplished by supporting the upper clamp $w^4$ upon pivoted arms $w^5$, which arms are adjusted to the desired position by means of a stop screw $w^{10}$ against which one of the arms is held by a spring $w^{11}$ which is supported in an arm $w^{12}$ attached to a rod $w^{13}$ secured to the frame W. (Figs. 1 and 7.) By these devices the threads are drawn taut around the feed-screw.

The improvements in the thread separating and feeding devices, consist in making the several operating parts separate, so that they may be easily assembled and readily adjusted in relation to one another. Referring to Fig. 12, S is the feed-screw shaft; $s'$ a frusto-conical fluted portion which first receives, disentangles and separates the warp-threads; $s^2$ the selecting, spacing and feeding screw for the warp-threads, and by which they are presented to the hook of the drawing-in needle successively, one at a time; $s^3$ is a supplemental extension of the shaft S and upon which the portions $s'$ and $s^2$ are supported. In the specific construction illustrated, the end $s^4$ of the shaft portion $s^3$ is made smaller in diameter than the middle portion, and upon this smaller portion the sleeve $s'$ is held by contact at one end against the shoulder $s^5$ and at the other end by a shoulder of the shaft S. The supplemental shaft $s^3$ is connected with the shaft S by a screw upon the end of the latter which engages a hole tapped in the end of the supplemental portion $s^3$, as indicated in dotted lines at $s^6$, Fig. 12. The screw portion $s^2$ fits upon the part $s^3$ of the supplemental shaft, and is held in the desired position thereon by means of a clamping nut $s^7$ which engages the threaded portion $s^8$ upon the supplemental shaft and may be screwed tightly against the end of the portion $s^2$ to clamp the screw portion $s^2$ between the frusto-conical portion $s'$ and the nut $s^7$. The arc through which the clamping nut $s^7$ may be turned may be limited by a stop-collar $s^9$, clamped upon the supplemental shaft in proximity to the end of the nut $s^7$, from which nut projects an arcuate lip $s^{10}$ to engage a similar lip $s^{10}$ on the stop-collar. The feed-screw portion $s^2$ is made separate from the shaft $s^3$ for the purpose of independent rotation, in order that the foremost thread engaged by that screw may be accurately adjusted in reference to the path of the drawing-in needle, so that the needle in its backward movement will be sure to catch the foremost thread and draw it in. After the screw portion $s^2$ has been once thus adjusted and clamped by the nut $s^7$, each revolution thereafter will bring a new thread in accurate position to be caught by the drawing-in needle.

In Figs. 13 to 17 are shown side and end views of the several parts of the warp-separating and spacing device which are all assembled in Fig. 12. In Fig. 18 is another form of device which may be employed in place of the nut $s^7$ and collar $s^9$, for locking the feed-screw portion $s^2$. In this device, Fig. 18, a ring $t$ is secured to the supplemental shaft $s^3$ by two set-screws $t'$. Longitudinally through the ring $t$ two holes $t^2$, $t^3$ are bored, and upon the knurled disk $t^4$ is a projecting pin $t^5$ which fits into the hole $t^2$. This pin $t^5$ is a little longer than the ring $t$ and projects beyond its face, and when in proper position on the supplemental shaft $s^3$, the end of the pin $t^5$ fits into a hole $s^{11}$ in the end of the screw portion $s^2$, Fig. 27. The other hole $t^3$ in the ring $t$ is counterbored, so as to leave an annular shoulder at the end next to the disk $t^4$, and within this counterbored hole a coiled expansion spring $t^6$ is placed, and a screw or pin $t^7$ with a head of the same diameter as the counterbored hole $t^3$ is inserted through the spring and its small end riveted or screwed into the disk $t^4$. In this way the spring $t^6$ is held between the head of the pin $t^7$ and the annular shoulder within the hole $t^3$. When, therefore, it is desired to turn the screw portion $s^2$, independently of the shaft $s^3$, by grasping the disk $t^4$ the pin $t^5$ may be withdrawn from engagement with the part $s^2$, and when that part has been turned as desired the spring $t^6$ will press the pin $t^5$ into engagement with the sleeve $s^2$ again.

Referring to Figs. 12 and 19, $l$ is an angular finger attached to an arm $l'$ pivoted to the standard $A^3$. The finger $l$ bears upon the warp-threads between the upper clamp $w^4$ and the frusto-conical portion $s'$, and may be termed a depressor, said finger serving to maintain the threads in certain engagement with the separating screw. A torsion spring $l^5$ acting upon the arm $l'$ serves to press the finger $l$ against the threads. $l^2$ is another finger attached to the standard $A^3$ in a position to bear against the warp-threads between the lower clamp $w^3$ and the screw $s^2$, and is made of such a length that the warp-threads will snap off the end thereof before they arrive at the proper position to be caught by the drawing-in needle. This snapping of the threads will tend to separate any two threads which might accidentally remain stuck together by the sizing material or from any other cause. Another finger $l^3$, which may be termed a stop-finger, is supported in the said arm $l'$ and its end projects down across the plane in which the warp-threads lie between the clamp $w^4$ and the screw $s^2$, for the purpose of holding the threads back and assisting in giving them the proper angle or slope in relation to the pitch of the thread of the screw $s^2$. After the proper slope of the warp-threads in relation to the pitch of the screw $s^2$ has been determined, the position of the outermost thread of the series may be indicated by adjusting the point of a swinging finger $l^4$ which projects from the standard $A^3$ below the finger $l^2$ to that determined position. One end of the shaft of the warp-feed screw is supported in an opening bearing $d^{12}$ on a bracket $d^{10}$ on the standard $A^3$ and the other end in a bracket $d^{11}$ (Fig. 10) on the gear head Y. Said gear head is rigidly connected with the carriage A so as to travel therewith. The shafts I, $I^2$ and S are detachably connected to their respective drive shafts $I^a$ $I^b$ and $S^a$ by any suitable means, as, for example, by couplings comprising latches $d^{13}$ which may be similar to those fully disclosed in our application Serial No. 142,250 (which application has since matured into Patent No. 980,086). The shafts $I^a$, $I^b$, $I^3$ and $S^a$ are driven by means of a cross-shaft N, on one end of which is a beveled gear N' which meshes with a corresponding gear M' upon the driving shaft M, the gear M' being splined to the shank M and being mounted to slide along the shaft in the travel of the gear head Y. Upon the other end of the shaft N is a beveled gear $n'$ which meshes with a corresponding gear $n^2$ on the end of a countershaft $n^3$. Intermediate means for operatively connecting this driving mechanism and the shafts I, $I^2$, &c., consists of the following described mechanism. Upon the countershaft $n^3$ is a disk wheel $n^4$ (Fig. 11) provided upon one of its faces with two diametrically opposite anti-friction rolls $n^5$ and between these two rolls with projecting annular segments $n^6$; shown in dotted lines, Fig. 11. Upon another shaft $n^{12}$ a little above the shaft $n^3$ is what may be termed an intermittent wheel, or "Geneva-stop gear," $n^7$, which has across its face toward the wheel $n^4$ two channels $n^8$ arranged at right angles to one another, and between each two extremities of these channels is a ridge $n^9$ formed in a curve of the same radius as the annular segments $n^6$ on the wheel $n^4$; but the counterpart of those segments; that is, with the highest point of the curved ridge, nearest the center of the wheel $n^7$. When the wheel $n^4$ is rotated the segments $n^6$ slide over the surfaces of the curved ridges $n^9$ and prevent the wheel $n^7$ from turning until one of the rolls $n^5$ arrives at the extremity of one of the channels $n^8$, as shown in Fig. 11; then as the wheel $n^4$ continues its rotation, the roll $n^5$ passes up into that channel and out again, thereby turning the wheel $n^7$ a quarter of a rotation. During the next quarter rotation of the wheel $n^4$ the intermittent wheel $n^7$ is locked by the other segment $n^6$, and during its next quarter turn the opposite friction roll $n^5$ engages another channel in the wheel $n^7$ and gives it another quarter rotation, and so on; during each half rotation of the wheel $n^4$ the wheel $n^7$ is intermittently turned a quarter rotation. Beneath the pinions $p$, $p'$ upon the same shaft $n^{12}$ with the wheel $n^7$, is a gear $n^{10}$, which engages both of those pinions, and as the pinion $p^2$ is in train with the pinions $p^3$ and $p^4$, the shafts $S^a$, $I^a$, $I^b$ and $I^3$, with which the said pinions are respectively connected, will be intermittently rotated. In the machine illustrated, the pinion $p$ is made of such proportions in relation to the others that it rotates once while the others make a half rotation, so that the warp-feed screw $s^2$ makes one rotation while the harness worms $i'$ and the reed-feed worm $r^9$ each make a half rotation.

From the foregoing description it will be understood that the carriage, which supports the drawing-in needle and the warp-feed screw, is the only element which is given an invariable, positive movement longitudinally of the machine frame parallel with the reed and harnesses, while the reed, the harnesses and the warp-thread clamps are all supported by bearings upon which each may readily be fed or moved longitudinally, that is, parallel with the traverse of the carriage and differentially thereto, by the devices which severally automatically act upon the respective parts mentioned, during the drawing-in operation; and each of the latter three parts may be moved in relation to each other so as to compensate for the differences in width between them respectively, and for the irregularities in the spacing of their component or contained elements, namely, the reed dents, harness eyes and warp-threads, for the purpose of bringing such contained elements successively into such relation to the path of reciprocation of the needle that one of each will be placed properly and accurately for action by the needle at each reciprocation.

This is a combination never before employed in machines of this character, so far as the art is disclosed, and among other improvements herein described is made the subject-matter of a claim herein.

The means herein described relate to the art of controlling and feeding a body or series of warp-threads as related to the control and feed of other elements parallel with said body or series of warp-threads for the purpose of alining said series of threads and said other elements for the proper coöperation of other mechanism; and said improvements also relate to the art of so feeding such a body or series of warp threads with reference to an independently fed, thread-separating device adapted to separate the threads singly and successively from the series. Such improvements are, therefore, obviously adapted for use in all classes of machines in which a series of threads is designed to be acted upon by a separating device alone or with other elements through the controlling and feeding of such series or body of warp threads as a mass and the successive separating and disengaging of such threads from the series.

Without, therefore, intending to limit ourselves to the precise forms of mechanism herein disclosed or to any particular mode of using the same, what we claim is:

1. A warp-drawing machine having, in combination, a main frame; an automatically traversing carriage on said main frame; thread-selecting and drawing mechanism on said carriage; a reed holding device movably mounted on said main frame; a plurality of devices movably mounted on the main frame, each for holding a single harness; a warp-holding device movably mounted on said main frame; and means for automatically moving each of said holding devices on the main frame, independently of each other, parallel with and differentially to the traverse of said carriage.

2. In a warp-drawing machine, embodying a drawing-in device, a traversing carriage supporting the same, means to support loom harnesses to move longitudinally, and mechanism which engages the respective harnesses and automatically and positively moves each independently of the others, parallel with the movement of the traversing carriage and differentially thereto, for the purpose specified.

3. A warp-drawing machine having, in combination, a bed, an arch rising from the bed, a warp carriage supported on one side of the arch for movement longitudinally of the bed, a carriage arranged at the other side of the arch to travel longitudinally of the bed, mechanism on the second carriage for operating on the warp, and means supported on the first-mentioned side of the arch and extending longitudinally thereof above the warp carriage and connected to the warp carriage for manually moving the latter.

4. In a warp-drawing machine, a reciprocating drawing-in needle, a traversing carriage supporting the same, means for supporting a plurality of loom harnesses to move longitudinally upon their respective bearings therein, and mechanism to engage each harness and positively and automatically move it independently of and differentially to the movement of the others.

5. A warp-drawing machine having, in combination, a bed, an arch rising from the bed, a warp carriage supported on one side of the arch for movement longitudinally of the bed, a carriage arranged to travel longitudinally of the bed, mechanism on the second carriage for operating on the warp, and a hand rod supported on the arch and extending longitudinally thereof above the warp carriage and connected to the warp carriage for manually moving the latter.

6. A warp-drawing machine having, in combination, a bed, an arch rising from the bed, a warp carriage removably supported on one side of the arch for movement longitudinally of the bed, a carriage arranged to travel longitudinally of the bed, mechanism on the second carriage for operating on the warp, a hand rod rotatably supported on the arch and extending longitudinally thereof above the warp carriage, and separable connections between one end of said rod and the warp carriage for transmitting movement to the latter.

7. A warp-drawing machine having, in combination, a main frame, antifriction rollers on the frame, a plurality of bars mounted on the rollers for independent movement, and adjustable harness-suspending devices depending from each of said bars.

8. A warp-drawing machine having, in combination, means for supporting two harnesses side by side, a shaft extending between the harnesses, a heddle-eye-positioning member on said shaft, and means for intermittently oscillating said shaft, including spring means for restoring the shaft to central position.

9. A warp-drawing machine having, in combination, means for supporting two harnesses side by side, a shaft extending between the harnesses, a heddle-eye-positioning member on said shaft, and means for oscillating said shaft comprising a lever attached to said shaft, a second lever pivoted between its ends, the first lever engaging one arm of the second lever, and two members moving in opposite directions into alternating engagement with the other arm of the second lever.

10. A warp-drawing machine having, in combination, means for supporting two harnesses side by side, a heddle-separating screw in engagement with each harness, a ledge below each screw, a member pivoted at a point between the harnesses, means to swing said member into engagement with the successive heddles of said harnesses alternately at a point below said ledge to press the heddle eye against the ledge, and a drawing needle reciprocable through the successively positioned eyes.

11. A warp-thread selecting and separating screw for a machine for operating upon warp threads, consisting of a rotatable shaft, a movable sleeve thereon which has the warp separating screw-thread in its surface, and means at the respective ends of said sleeve to control its rotational position upon said shaft.

12. A warp-thread separating and selecting device for a machine for operating upon warp threads, consisting of a rotatable shaft, a movable sleeve thereon which has a warp separating screw-thread in its surface and devices at the end of said separating screw, to lock it automatically to the shaft at prescribed rotational positions thereon.

13. A warp-thread selecting and separating screw for a machine for operating upon warp threads, consisting of a shaft, a rotatable sleeve upon said shaft, which sleeve has the warp separating screw-thread in its surface, and a collar or nut upon the shaft at the end of said sleeve to hold it in the desired rotational position upon the shaft.

14. A warp-thread separating and selecting device for a machine for operating upon warp threads, consisting of a shaft, a movable sleeve upon one said shaft, the surface of which sleeve is provided with a warp-separating screw-thread, a frusto-conical sleeve upon the shaft in advance of the separating-screw sleeve and an adjustable limiting and locking device in the rear of said screw sleeve, for the purpose described.

15. A warp-thread separating and selecting device for a machine for operating upon warp threads, consisting of a rotatable shaft, a movable sleeve upon one portion thereof, the surface of which sleeve is provided with a warp-separating screw-thread, a warp disentangling sleeve in advance of the said separating screw, and a locking device to hold said separating screw in the desired rotational adjustment on the shaft.

16. In a warp-drawing machine, a reciprocating drawing-in needle, a warp-separating screw adapted to be rotated independently of its shaft and means upon the shaft to arrest the rotation of the sleeve and automatically lock it at predetermined positions.

17. In a warp-drawing machine, a reciprocating drawing-in needle, a vibrating needle-stripper and mechanism to cause the said stripper to cross the path of the needle when the latter is in its backward position, and to pass around said path during the remainder of the stripper movement.

18. In a warp-drawing machine, a heddle separating screw, a ledge which extends partially across the screw and serves as a bearing, at one side of the harness-eye, for the heddle or eye support contained in the thread of the screw, and an oscillating arm which engages the heddle and serves as a bearing therefor upon the other side of the eye, during each drawing-in operation.

19. In a warp-drawing machine provided with means for engaging and separating the heddles or harness-eye supports, a guiding ledge against which the said supports bear at one side of the eye, and an oscillating arm which bears upon said supports at the other side of the eye, during each drawing-in operation.

20. In a warp-drawing machine, a warp-thread selecting and separating screw and mechanism to move the warp-holding devices in a direction parallel with the axis of the screw to regulate the slope or angle of the warp-threads in relation to the pitch of the thread of the selecting screw, for the purpose described.

21. In a warp-drawing machine, mechanism to parallel the warp-threads and select them singly from the mass, means to separate and maintain in predetermined separated positions a series of selected threads, a reciprocating device to successively draw-in the threads of the separated series, and means to hold the warp-threads and regulate their tension and angle of slope in relation to the selecting and separating mechanism.

22. A warp drawing machine having a drawing in device, means for supporting a warp, means for supporting a plurality of harnesses, means for selecting individual heddles of each harness, and means providing for an automatic and independent adjustment of the several harnesses.

23. A warp drawing machine having a drawing-in device, means for supporting a warp, means for supporting a plurality of harness supports, each independently and automatically adjustable in a longitudinal direction, and means for separating and feeding the successive eyes of the respective harnesses.

24. A warp drawing machine having a drawing in device, a movable warp support, a plurality of separately and independently movable harness supports, said supports being moved progressively and longitudinally, and a separate and independently movable reed support.

25. A warp drawing machine having a drawing-in device, a warp support, separate and independent supports for a plurality of harnesses, means for causing relative progressive movement of the drawing in device across the warp support, and means for causing independent and differential adjustment of the harness supports with relation to the drawing in device.

26. A warp-drawing machine having, in combination, a thread-drawing device, a warp support, a longitudinally adjustable reed-support, and a harness support which is adjustable longitudinally and independently of the warp support and the reed support.

27. A warp-drawing machine having a vertically adjustable reed carriage and means for locking the reed carriage in its adjusted position.

28. A warp-drawing machine having a reed carriage, and means for supporting said carriage for longitudinal and vertical adjustment.

29. A warp drawing machine having a reed carriage, means for automatically adjusting the same in a longitudinal direction and means for vertically adjusting the same.

30. A machine for operating upon warp threads having a thread-separating shaft, a warp worm adapted to turn with said shaft, said warp worm being longitudinally adjustable on said shaft.

31. A warp drawing machine having a warp support, a longitudinally movable harness support, a longitudinally adjustable reed carriage in which the reed is immovably held, said reed carriage being longitudinally movable independently of the movement of the harness support, and means for automatically moving said reed carriage and said harness support.

32. In a warp drawing machine the combination with drawing in mechanism of an endwise movable harness support and positioning mechanism for the harness in constant engagement with a plurality of the heddles of said harness.

33. In a warp drawing machine, the combination with drawing in mechanism of a harness support freely movable endwise, and rotary positioning mechanism for the heddle eyes continuously engaged with the heddles.

34. In a warp drawing machine, the combination with drawing in mechanism of an endwise movable harness support, an auxiliary spacing device directly engaging the successive heddles of the harness and means in continuous engagement with the heddles for spacing and positioning the heddle eyes through the medium of said spacing device.

35. In a warp drawing machine, the combination with drawing in mechanism, an endwise movable harness support, a member continuously engaged with a succession of heddles, and harness feeding means adapted to feed the harness through engagement with said member.

36. In a machine for successively selecting and operating upon warp threads, the combination with a main driving mechanism for the machine, warp-holding means, warp-thread-selecting mechanism normally connected to the main driving mechanism of the machine, and means located near the point of thread selection whereby the operator may disconnect the thread selecting mechanism from the driving mechanism and manually actuate the thread selecting mechanism independent of the driving mechanism.

37. In a machine for successively selecting and operating upon warp threads, the combination with main driving mechanism for the machine, warp holding means, warp thread selecting mechanism comprising a warp thread selecting screw mounted and driven by a warp rod, the latter normally connected to the main driving mechanism, the said screw being in sleeve form, and means whereby the operator may disconnect the screw from the warp rod and manually actuate the same.

38. In a machine for successively selecting and operating upon warp threads, the combination with a main driving mechanism for the machine, warp holding means, warp thread selecting mechanism normally connected to the main driving mechanism including means extending across the body of unseparated threads and means for disconnecting the selecting mechanism and manually operating the same, said disconnecting means being positioned free of the edge of the unseparated threads.

39. In a warp replenishing machine, a carriage to support a transverse section of a warp with the threads thereof distended in parallel arrangement, a second carriage, a warp worm supported thereon to work successively upon said threads, one main power means, a power driven means operatively connected to said one main power means and to said carriages to move both of said carriages from said one main power means, said power driven means including means to move said second carriage transverse the machine and also including means to give to said first mentioned carriage and its contained threads a feeding movement differentially related to the feeding movement of said second mentioned carriage.

40. In a machine for operating upon warp threads, the combination with a main frame, of a carriage to support a transverse section of warp with the threads thereof distended in parallel arrangement, a movable operating carriage, a warp worm supported thereon to work successively upon said threads, one main power means, and power driven means operatively connected to said one main power means and to said carriages to move both of said carriages from said one main power means, said power driven means including means to move said second mentioned carriage transverse the warp threads lengthwise the machine frame, said power driven means also including step-by-step feed means to give the said first mentioned carriage and its contained threads a feeding movement differentially related to the feeding movement of said second mentioned carriage.

41. In a warp replenishing machine, a carriage to support a transverse section of a warp with the threads thereof distended in parallel arrangement, a second carriage, a drawing needle and a warp worm supported upon said second carriage to work successively upon said threads, one main power means, a power driven means operatively connected to said one main power means and to said carriages to move both of said carriages from said one main power means, said power driven means including means to move said second carriage transverse the machine and also including means to give to said first mentioned carriage and its contained threads a feeding movement differentially related to the feeding movement of said second mentioned carriage.

42. In a warp drawing machine, a reciprocatory drawing-in needle, a traversing carriage therefor, a movable warp thread support, a movable harness support, a movable reed support, and means for imparting to each of said supports independent, differential, adjusting motion to accommodate the differences in spread and spacing.

43. In a warp drawing machine, a reciprocatory drawing-in needle, a traversing carriage therefor, a movable warp thread support, a movable harness support, a movable reed support, means for imparting to each of said supports independent, differential, adjusting motion to accommodate the differences in spread and spacing, and means to impart manual, compensating adjustment to the warp carriage.

44. The combination of a warp thread carriage, a carriage having a warp worm to act sequentially upon the threads, and a main driving power shaft connected to move both said carriages with a differential, progressive movement.

45. The combination of a warp thread carriage, a carriage having a warp worm to act sequentially upon the threads, a main driving shaft, and means connected therewith to move both of said carriages with a differential progressive movement and including means to progress one of said carriages with a step-by-step movement.

46. The combination of a warp thread carriage, a carriage having a warp worm and a drawing needle to act sequentially upon the warp threads, and a main driving power shaft connected to move both said carriages with a differential, progressive movement.

47. The combination of a warp thread carriage, a carriage having a warp worm and a drawing needle, to act sequentially upon the warp threads, a main driving power shaft connected to move both said carriages with a differential, progressive movement, and means to impart compensating, manual movement to the warp threads.

48. The combination of a warp thread carriage, a carriage having a warp worm and a drawing-in needle, to act sequentially upon the warp threads, a main driving power shaft connected to move both said carriages with a differential, progressive movement, and means to impart compensating, manual movement to the warp thread carriage.

MILLARD F. FIELD.
CHARLES D. LANNING.
EDGAR F. HATHAWAY.
FREDERICK C. BLANCHARD.

Witnesses:
J. K. LANNING,
AGNES B. HUDSON,
A. F. CHAPIN,
W. M. SPRY.

It is hereby certified that in Letters Patent No. 1,383,195, granted June 28, 1921, upon the application of Millard F. Field, of Winthrop, and Charles D. Lanning and Edgar F. Hathaway, of Boston, Massachusetts, and Frederick C. Blanchard, of Fort Wayne, Indiana, for an improvement in "Machines for Operating upon Warp-Threads," errors appear in the printed specification requiring correction as follows: Page 1, line 70, for the word "or" read *of;* page 3, line 90, insert the word *is* before the word "shown"; page 5, line 76, for the word "worn" read *worm;* page 6, line 3, for the word "it" read *is;* page 9, line 76, claim 14, strike out the word "one"; and that the said Letters Patent should be read with these corrections therein that the same may conform to the record of the case in the Patent Office.

Signed and sealed this 23d day of August, A. D., 1921.

[SEAL.]

KARL FENNING,

*Acting Commissioner of Patents.*

Cl. 139—94.